United States Patent [19]

Hong et al.

[11] Patent Number: 5,842,867
[45] Date of Patent: Dec. 1, 1998

[54] GRAPHIC TACTILE CELL

[75] Inventors: Ri Su Hong; In Sik Lee; Akiyoshi Morita, all of Tokyo, Japan

[73] Assignee: KGS Corporation, Japan

[21] Appl. No.: 843,915

[22] Filed: Apr. 17, 1997

[51] Int. Cl.[6] .................................................. G09B 21/00
[52] U.S. Cl. .......................................... 434/114; 434/113
[58] Field of Search ................................... 434/113, 114, 434/115, 112

[56] References Cited

U.S. PATENT DOCUMENTS

| | | |
|---|---|---|
| 3,299,387 | 1/1967 | Linvill . |
| 4,283,178 | 8/1981 | Tetzlaff .................................... 434/114 |
| 4,633,121 | 12/1986 | Ogawa et al. ........................... 434/114 |
| 4,664,632 | 5/1987 | Tretiakoff et al. ...................... 434/114 |
| 4,758,165 | 7/1988 | Tieman et al. .......................... 434/114 |
| 5,226,817 | 7/1993 | Nakajima et al. ...................... 434/115 |
| 5,286,199 | 2/1994 | Kiake ...................................... 434/112 |
| 5,449,262 | 9/1995 | Tam et al. ............................... 434/113 |
| 5,466,154 | 11/1995 | Thompson .............................. 434/114 |
| 5,580,251 | 12/1996 | Gilkes et al. ........................... 434/112 |
| 5,685,720 | 11/1997 | Kashi ...................................... 434/114 |
| 5,685,721 | 11/1997 | Decker ................................... 434/114 |

FOREIGN PATENT DOCUMENTS

| | | |
|---|---|---|
| 0 581 352 A1 | 2/1994 | European Pat. Off. . |
| 2463466 | 2/1981 | France . |
| 3733612 A1 | 4/1989 | Germany . |
| WO89/11712 | 11/1989 | Germany ................................ 434/114 |
| 3811406 A1 | 1/1990 | Germany . |
| 3920386 A1 | 1/1990 | Germany . |
| 3923967 A1 | 1/1991 | Germany . |
| 4241937A1 | 6/1994 | Germany . |
| 1-54712 | 7/1985 | Japan . |
| 3-32236 | 10/1987 | Japan . |

OTHER PUBLICATIONS

Japanese Abstract 08220988; Fujiwara Yasuhiro; Braille Data Input/Output Terminal; Aug. 30, 1996.
Japanese Abstract 06289775; Kumeno Kiyomitsu; Braille Character Reading Sensor; Oct. 18, 1994.
Japanese Abstract 05333765; Shimokura Kenichiro; Data Input/Output Device; Dec. 17, 1993.
European Patent Office Search Report; 97106110.6; KGS Corporation; Feb. 24, 1998.

*Primary Examiner*—Paul J. Hirsch
*Attorney, Agent, or Firm*—Christensen O'Connor Johnson and Kindness PLLC

[57] ABSTRACT

This invention relates to a graphic tactile cell for indicating a graphic pattern, in which the arrangement of the tactile surface can be enlarged easily. This graphic tactile cell includes tactile pins for indicating a graphic pattern by vertical movement, piezoelectric element segments which are bent upon application of a voltage to vertically drive the tactile pins, and a unit base for holding the tactile pins and the piezoelectric element segments. A plurality of cell units each including a unit number of tactile pins, corresponding piezoelectric element segments, and a unit base for holding the tactile pins and the piezoelectric element segments are coupled vertically and horizontally such that the tactile pins are arranged at an equal interval in vertical and horizontal directions. Proximal ends of the piezoelectric element segments are held by the unit base through plastically deformable adjusting members.

8 Claims, 4 Drawing Sheets

GRAPHIC TACTILE CELL

BACKGROUND OF THE INVENTION

The present invention relates to the technique of a graphic tactile cell for indicating a graphic pattern, a braille pattern and the like to a visually handicapped person and, more particularly, to the technique of a graphic tactile cell in which the tactile surface can be enlarged easily and the operability in the manufacture and maintenance is improved.

As a means that readily transmits graphic information or the like dealt with by a computer to a visually handicapped person, a graphic tactile apparatus is known which indicates the graphic information as an original two-dimensional expression in the form of dots and transmits the graphic information through tactile reading.

Conventionally, as a graphic tactile apparatus of this type, for example, U.S. Pat. No. 3,229,387 discloses an apparatus in which a large number of piezoelectric operation segments are densely arranged on a printed circuit board to be inclined by a predetermined angle. These piezoelectric operation segments are vibrated in accordance with graphic information to be indicated. The indicated content is read when a finger touches the distal ends of the piezoelectric operation segments, i.e., through a finger touch. Since this graphic tactile apparatus has an integral arrangement in which the number of dots constituting the tactile surface is limited to, e.g., 10×11, it is difficult to arbitrarily increase or decrease the number of dots constituting the tactile surface. Accordingly, if the tactile surface must be enlarged in order to increase the number of dots of the tactile surface, a tactile surface meeting each condition must be fabricated for apparatus by apparatus, leading to a high manufacturing cost.

As another technique, Jpn. Pat. Appln. KOKOKU Publication No. 1-54712 discloses a graphic tactile apparatus in which interdigital piezoelectric operation segments are arranged at a predetermined distance from each other and to be inclined at a predetermined angle. The piezoelectric operation segments are stationarily displaced in accordance with the graphic information to project tactile pins from the surface of a tactile plate. The graphic information is read when a finger touches the distal ends of the tactile pins. In this graphic tactile apparatus, since the constituent components must be prepared in accordance with the number of image dots, it is difficult to assemble. Regarding the structure, since the piezoelectric operation segments are interdigitally connected, the maintenance of the individual piezoelectric operation segments is difficult to perform. In addition, as the position adjustment of the individual tactile pins is difficult to perform due to their structure, the assembling efficiency is poor, leading to a high cost.

A graphic tactile apparatus also needs a technique that enables a visually handicapped person to recognize the finger touch position of indicated graphic information. As a means for informing the visually handicapped person of a finger touch position, German Patent No. DE 37 33 612 proposes ones that utilize light, e.g., one that uses a capacitance sensor, one that uses a combination of an optical fiber, a light-emitting diode, and an optical sensor, one that uses a combination of a light-emitting diode and a phototube, and the like. However, the technique which is disclosed in this reference and which detects a change in capacitance has many uncertain factors and thus lacks reliability. Also, the technique that utilizes light tends to be influenced by external light. In addition, these methods require complicated arrangements and their maintenance is difficult to perform, leading to a higher cost.

BRIEF SUMMARY OF THE INVENTION

The present invention has been made to solve the problems described above, and has as its object to provide a graphic tactile cell in which the graphic tactile surface can be enlarged with a large degree of freedom and manufactured and maintained easily.

According to the first characteristic feature of the graphic tactile cell of the present invention, a plurality of cell units each comprising the unit number of tactile pins, piezoelectric element segments corresponding to them, and a unit base for holding the unit number of tactile pins and the piezoelectric element segments are coupled to each other in the vertical and horizontal directions. The tactile pins are arranged at an equal interval in the vertical and horizontal directions. With this arrangement, the degree of freedom in enlargement of the graphic tactile surface is increased remarkably. Also, unit bases constitute the cell units, so that an economical tactile graphic cell can be formed.

The proximal end portions of the piezoelectric element segments are held by the unit base through plastically deformable members. With this arrangement, even if the bending characteristics of the individual piezoelectric element segments may somewhat vary in the manufacturing process, these variations can be easily corrected by deforming adjusting members after assembly.

In the graphic tactile cell according to the present invention, the bending displacement surface at one end of each piezoelectric element segment is arranged at a predetermined angle with respect to the graphic tactile surface, and the abutting surface of a tactile pin that abuts against this bending displacement surface is formed to be substantially parallel to the bending displacement surface. Each tactile pin is placed on the bending displacement surface of the corresponding piezoelectric element segment through the abutting surface and is supported to be vertically movable. In this arrangement, since the tactile pins and the piezoelectric element segments are not fixed to each other, the tactile pins can move vertically freely. Since the abutting surfaces of the piezoelectric element segments and those of the corresponding tactile pins are substantially parallel to each other, the movement of the piezoelectric element segments can be smoothly transmitted to the tactile pins. Since the tactile pins and the piezoelectric element segments are independent of each other, the assembly and maintenance are easily performed.

It is another characteristic feature of the present invention that the unit base that holds the piezoelectric element segments has groove portions for independently mounting and holding the piezoelectric element segments therein. With this arrangement, the respective piezoelectric element segments can be held independently and reliably stably, leading to an easy manufacturing process.

It is still another characteristic feature of the present invention that a strain sensor for detecting a finger touch is provided at the required position of each piezoelectric element segment, or a finger touch sensor is provided at the required position of the graphic tactile surface. With this arrangement, a low-cost graphic tactile cell capable of detecting a finger touch position reliably can be provided.

Furthermore, an arithmetic drive unit that applies a voltage to the respective piezoelectric element segments may be integrally formed with the unit base, or may be connected through a housing connection. With this arrangement, the manufacturing process or the inspection process is systemized to decrease the manufacturing cost.

According to the present invention, a graphic tactile cell is fabricated with a combination of cell units. Therefore, a graphic tactile cell can be provided in which assembly and exchange of components are easily performed and accordingly the maintenance is easily performed, while the degree of freedom in enlargement of the graphic tactile cell is large.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
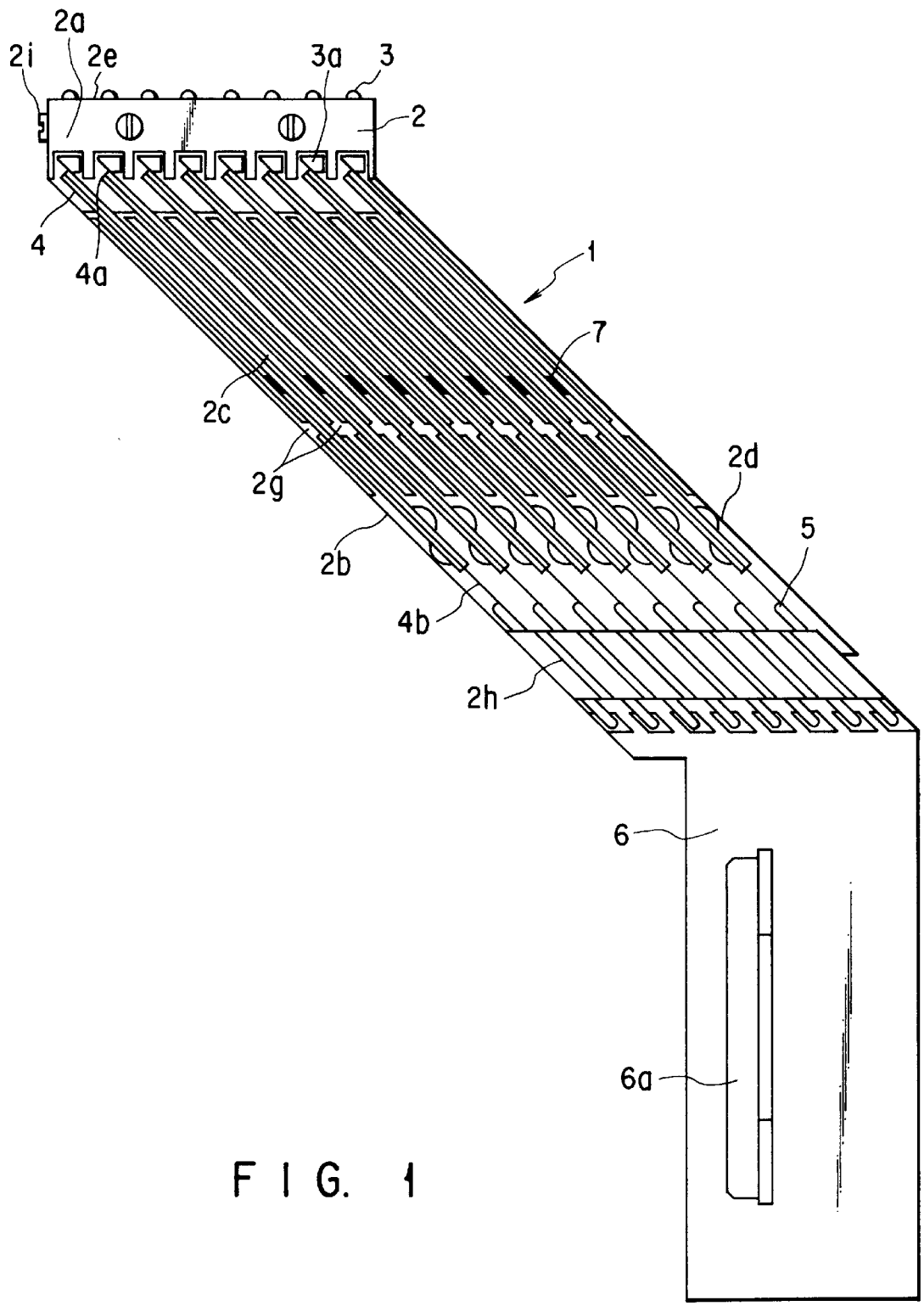
FIG. 1 is a side view of a cell unit of a graphic tactile cell according to an embodiment of the present invention.
Figure 2:
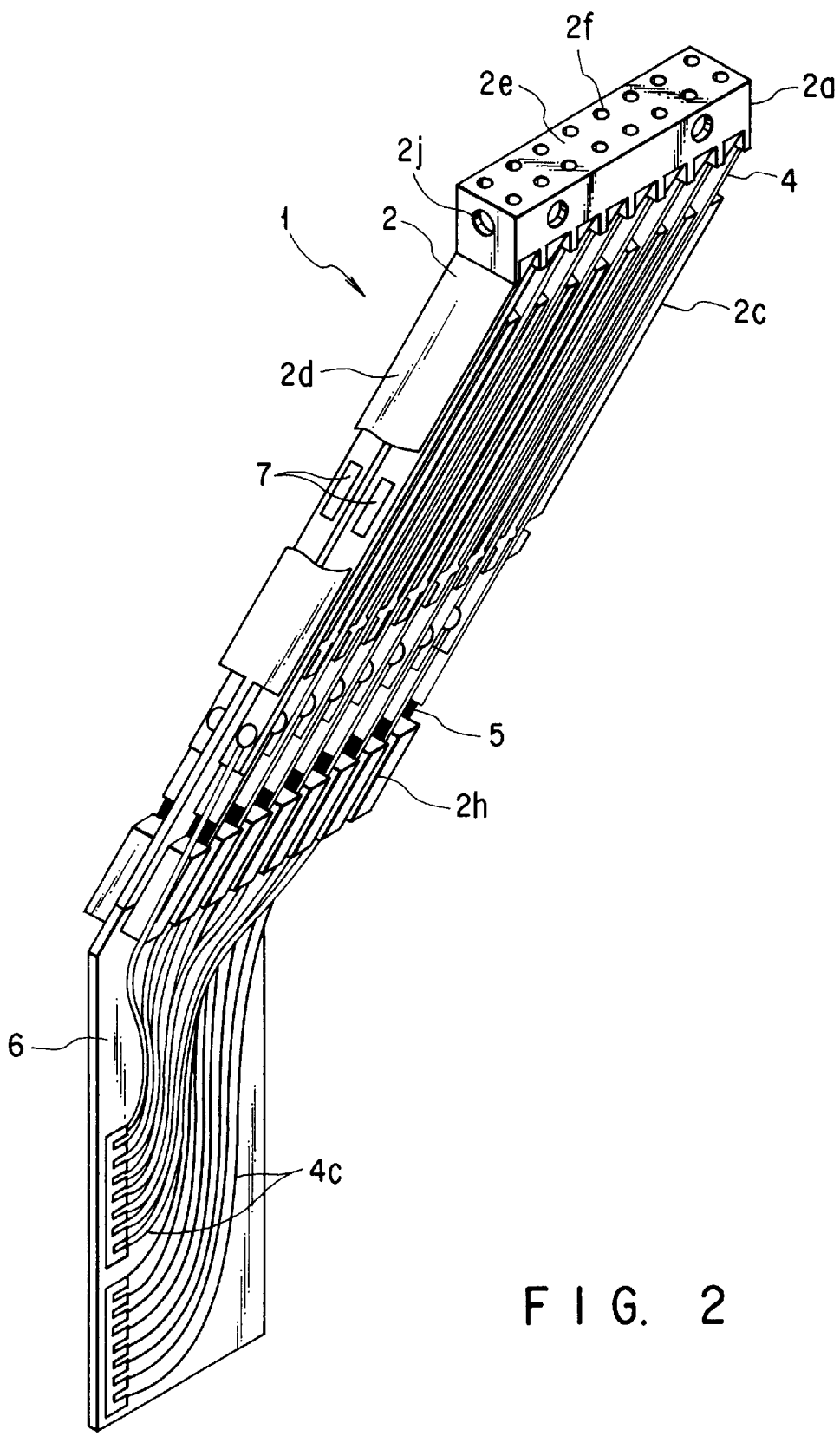
FIG. 2 is a partially cutaway perspective view of the cell unit of this embodiment.
Figure 3:
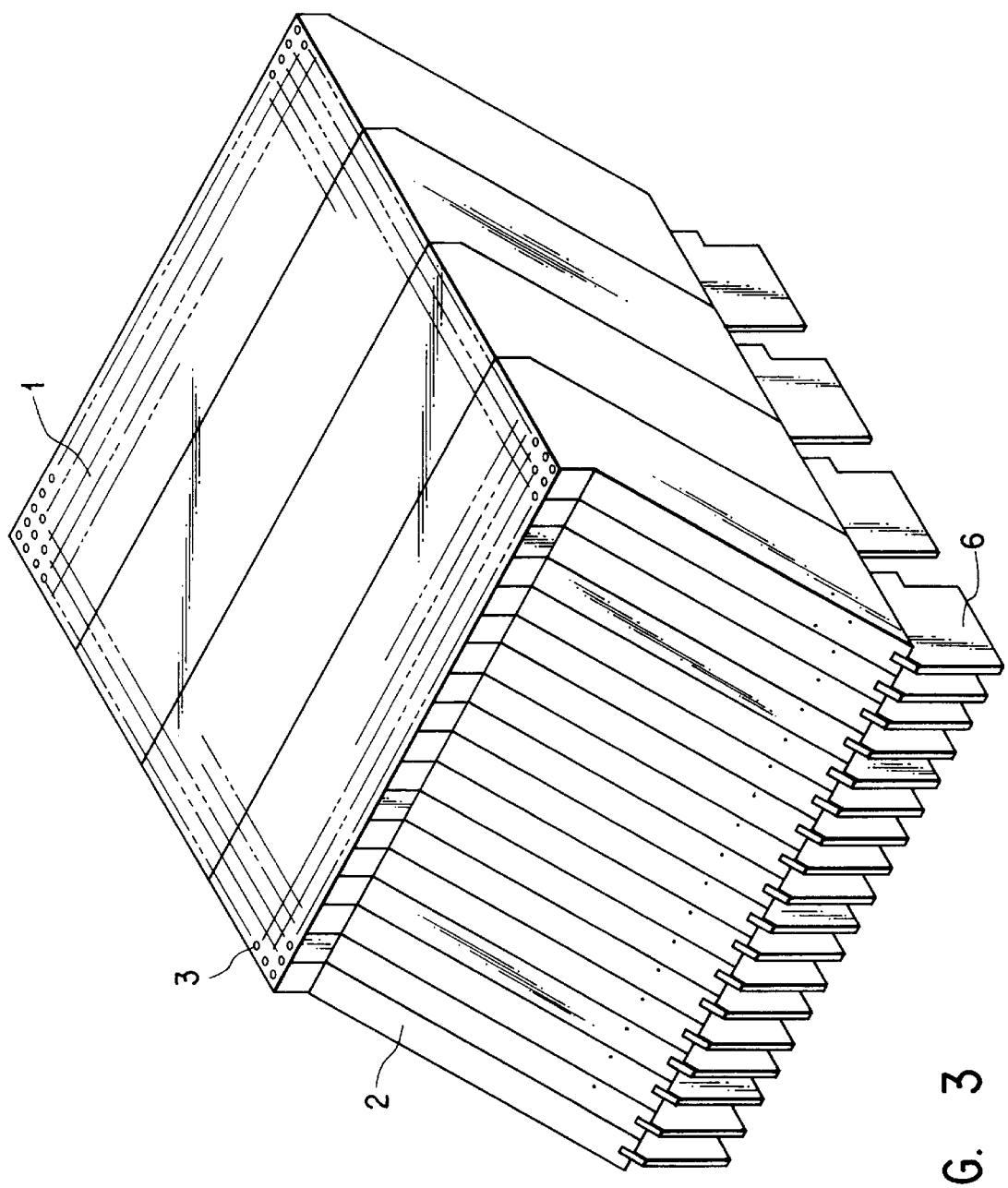
FIG. 3 is a perspective view of the graphic tactile cell of this embodiment which is constituted by a combination of cell units.

A graphic tactile cell according to the preferred embodiment of the present invention will be described with reference to the accompanying drawing. FIGS. 1 and 2 are side and perspective views, respectively, of a cell unit serving as the constituent unit of the graphic tactile cell of this embodiment. FIG. 3 is a perspective view of a graphic tactile cell in which a required graphic tactile surface is formed by coupling a plurality of cell units in the vertical and horizontal directions.

Referring to FIGS. 1 to 3, reference numeral 1 denotes a cell unit serving as the constituent unit of the graphic tactile cell. A combination of a plurality of cell units 1 constitutes a desired graphic tactile cell. In the cell unit 1, a unit base 2 molded of a synthetic resin or the like to hold unit constituent components serves as the main body of the structural mechanism. A tactile portion 2a located at the upper portion of the unit base 2 to indicate the graphic pattern holds right and left arrays of a total of 16 tactile pins 3 to be vertically movable. The front and back surfaces of a rhombic middle plate 2b which is below the tactile portion 2a of the unit base 2 to be in oblique contact with it obliquely hold 16 piezoelectric element segments 4 corresponding to the respective tactile pins 3 at a predetermined angle. A plurality of partition walls 2c for holding the piezoelectric element segments 4 to regulate their positions are formed on the front and back surfaces of the middle plate 2b to correspond to the respective piezoelectric element segments 4. A spacer plate 2d is formed on the upper right (in FIG. 1) surface of the middle plate 2b to serve also as the partition wall 2c and to maintain the distance to an adjacent cell unit. Through holes 2f, through which the tactile pins 3 project from the upper surface of a tactile surface 2e, are formed in the tactile portion 2a serving as the graphic tactile surface.

Pin stoppers 3a to abut against free ends 4a of the piezoelectric element segments 4 are formed on the lower portions of the tactile pins 3 that extend through the through holes 2f. The lower surfaces of these pin stoppers 3a that abut against the piezoelectric element segments 4 are formed at an angle to be substantially parallel to the free ends 4a of the piezoelectric element segments 4. The lower surfaces of the tactile pins 3 always abut against the free ends 4a of the piezoelectric element segments 4 to be parallel to them.

Lower proximal ends 4b of the piezoelectric element segments 4 are fixed to the lower portion of the unit base 2 through plastically deformable adjusting members 5 made of, e.g., soft copper. Fulcrums 2g serving as the nodes of the bending motion are formed at the intermediate portion of each partition wall 2c of the middle plate 2b close to the proximal end 4b of the piezoelectric element segment 4, to sandwich the corresponding piezoelectric element segment 4. The respective piezoelectric element segments 4 are thus supported by the unit base 2.

To drive the piezoelectric element segments 4 supported in this manner, lead wires 4c (not shown in FIG. 1) for connecting the piezoelectric element segments 4 and an arithmetic drive unit 6 with each other connect the piezoelectric element segments 4 and the arithmetic drive unit 6 through lead wire insertion grooves 2h formed in the unit base 2 near the proximal ends 4b. This arithmetic drive unit 6 drives a required piezoelectric element segment 4 through a connector 6a upon reception of an external input signal, and monitors the displacement of each piezoelectric element segment 4.

With this structure, when a positive voltage is applied to one surface of the piezoelectric element segment 4, this piezoelectric element segment 4 is bent, and its free end 4a is moved upward to push the corresponding tactile pin 3 upward. When a negative voltage is applied to the opposite surface of the piezoelectric element segment 4, this piezoelectric element segment 4 is bent to the opposite side, and the tactile pin 3 is moved downward. The person who touches the tactile pins 3 discriminates a graphic pattern from the vertical movement of the tactile pins 3.

In this embodiment, a finger touch detection means for informing the person who touches the tactile pins 3 of the finger touch position on the graphic tactile surface is arranged for each cell unit 1. Reference numeral 7 in FIG. 1 denotes a strain sensor adhered to the bent portion of the corresponding piezoelectric element segment 4 for this purpose. A lead wire (not shown) for outputting a change in output of the strain sensor 7 is connected to the arithmetic drive unit 6, in the same manner as the lead wire 4c of the piezoelectric element segment 4. When the piezoelectric element segment 4 to which the strain sensor 7 is adhered is bent upon a finger touch, the strain sensor 7 is strained and its resistance is changed. This change is sent to the arithmetic drive unit 6 through a bridge circuit or the like, thereby detecting a finger touch. Even if the piezoelectric element segment 4 is bent not by a finger touch but for the purpose of indicating a graphic pattern, the resistance of the strain sensor 7 changes. In this case, since a required voltage is applied to the piezoelectric element segment 4, this bend can be easily discriminated from a bend caused by a finger touch by referring to the drive voltage of the piezoelectric element segment 4 in the arithmetic drive unit 6.

Figure 4A:
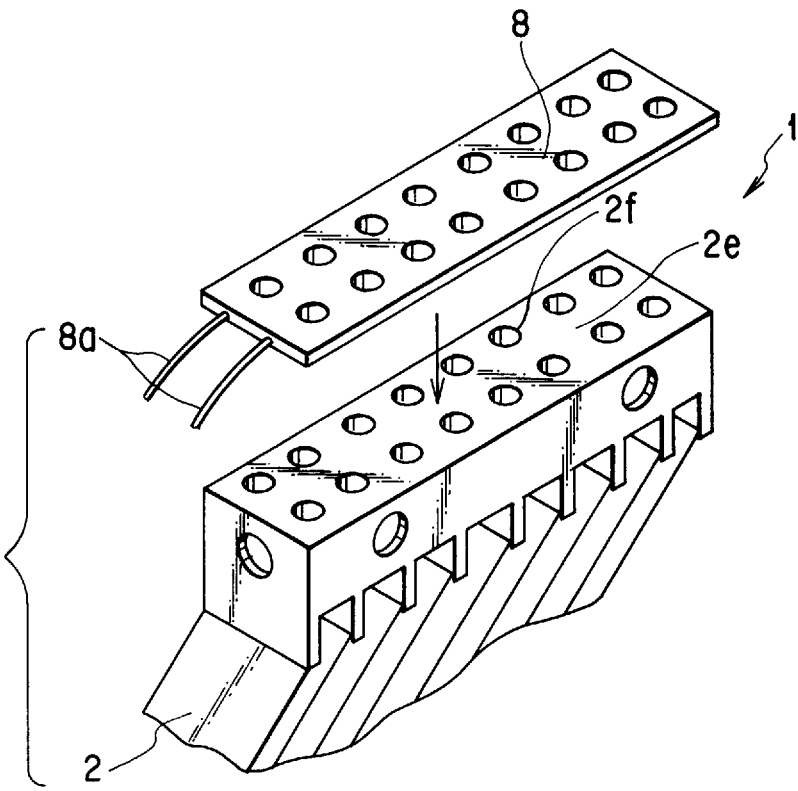
FIG. 4A is a cutaway perspective view of a cell unit to explain an example of a finger touch detection means.
Figure 4B:
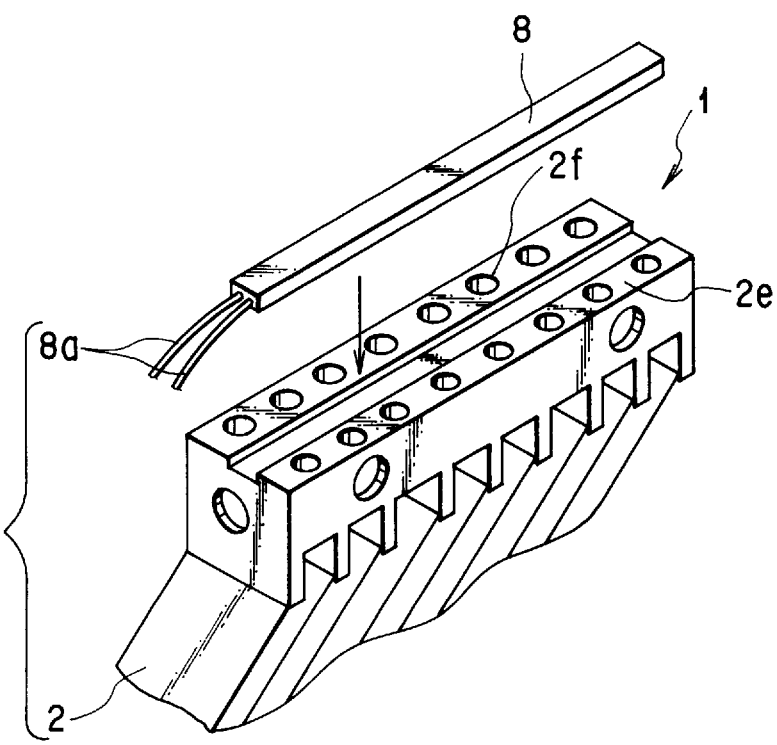
FIG. 4B is a cutaway perspective view of a cell unit to explain another example of the finger touch detection means.

FIGS. 4A and 4B show other finger touch means. FIG. 4A shows an embodiment in which a thin pressure sensor 8 is adhered on the surface of a tactile surface 2e to serve as a finger touch detection means. As the pressure sensor 8, a switch mechanism is known in which a rubber-like base dispersed with a metal powder at a high density is arranged between upper and lower conductive members whose finger touch surfaces are insulated in a known manner. When a depression is made across the upper and lower conductive members, the upper and lower conductive members are electrically connected to each other through the metal powder dispersed in the rubber-like base. In this embodiment, the pressure sensor 8 forms a thin elongated plate formed with holes through which tactile pins 3 can penetrate freely. Lead wires 8a for touch detection extend from the thin side surface portion of the pressure sensor 8 and are connected to an arithmetic drive unit 6 through a unit base 2. In this embodiment, finger touch detection is performed in each cell unit 1.

FIG. 4B shows an embodiment in which a narrow thin plate-like pressure sensor 8 is adhered, between two arrays of tactile pins 3, in a groove formed between the tactile pin holes. In this embodiment, the pressure sensor 8 has a simpler arrangement than that of FIG. 4A. Except for this, the arrangement and operation of the embodiment of FIG. 4B are substantially the same as those of the embodiment shown in FIG. 4A.

As another finger touch detecting member, a switch mechanism is known in which an insulating spacer formed with cut-out portions only at contact positions is sandwiched between upper and lower conductive members whose finger touch surfaces are insulated. When a depression is made across the upper and lower conductive members at a portion corresponding to the contact position, the upper and lower conductive materials can be brought into contact with each other through the cut-out portion. When this switch mechanism is used, an arrangement identical to those shown in FIGS. 4A and 4B can be obtained.

When fabrication of the single cell units 1 is almost ended, position adjustment of the piezoelectric element segments 4 is performed by the adjusting members 5. The bending characteristics and the like of the piezoelectric element segments 4 tend to vary in the manufacturing process. The adjusting members 5 aim at aligning the positions of the respective piezoelectric element segments 4 in assembly of the cell unit 1 with a simple process. More specifically, when a positive or negative voltage is applied to the piezoelectric element segment 4, the piezoelectric element segment 4 is ideally bent upward or downward at the same magnitude with respect to the fulcrums 2g. In practice, however, a difference occurs in upward and downward bend displacements. This displacement difference is adjusted by bending the adjusting member 5 formed on the proximal end 4b upward or downward. Position adjustment is thus performed such that the upper and lower bending ranges of the piezoelectric element segments 4 become equal, thereby completing assembly of the cell unit 1. In this adjustment, since a plastically deformable material is used to form the adjusting members 5, the adjusting operation is easy. Also, after adjustment, the deformed portion is not restored to the original state, but deformation obtained in adjustment is maintained.

The cell unit 1 formed and adjusted in the above manner is assembled with other cell units 1 as shown in FIG. 3 by fitting fitting projections 2i and fitting recesses 2j, formed on and in the side surfaces of the tactile portion 2a of one unit base 2, with the fitting recesses 2j and fitting projections 2i of the opposing cell unit 1. The outer sides of the side surfaces are fixed with a frame (not shown), and the cell units 1 are assembled into a graphic tactile surface having a required size. In this case, the graphic tactile surface vertically and horizontally couples the cell units 1 with each other such that the distances among the tactile pins 3 become equal between the vertical and horizontal directions.

In the above embodiments, the arithmetic drive unit 6 is integrally formed on the cell unit 1 together with the piezoelectric element segments 4 and the like. However, housing connection is also possible in which an arithmetic drive unit 6 is formed as a separate unit and is connected to a cell unit 1 mounted with piezoelectric element segments 4 and the like through a housing connector.

The present invention is not limited to the above embodiments, and various changes and modifications may be made without departing from the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A graphic tactile cell constituted by a plurality of cell units, each cell unit comprising:

a plurality of tactile pins for indicating a graphic pattern through vertical displacement with respect to a graphic tactile surface, piezoelectric element segments formed to correspond to said tactile pins and bent upon application of a voltage to vertically drive said tactile pins at free end portions thereof, and a unit base for holding a unit number of tactile pins and the unit number of piezoelectric element segments, wherein said graphic tactile cell is formed by vertically and horizontally coupling said plurality of cell units such that said tactile pins on adjacent cell units, are arranged at an equal interval in vertical and horizontal directions.

2. A cell according to claim 1, wherein each of said piezoelectric element segments is formed such that a bending displacement surface of said free end thereof is arranged at a predetermined angle with respect to said graphic tactile surface, abutting surfaces of said tactile pins (3) that abut against said bending displacement surfaces are formed to be substantially parallel to said bending displacement surfaces, and said tactile pins are placed on said bending displacement surfaces of said piezoelectric element segments through said abutting surfaces and are supported to be vertically movable.

3. A cell according to claim 1, wherein a proximal end of each of said piezoelectric element segments is held by said unit base through a plastically deformable adjusting member.

4. A cell according to claim 1, wherein said unit base has a plurality of groove portions for mounting and holding said piezoelectric element segment in each groove portion.

5. A cell according to claim 1, wherein a strain sensor for detecting a finger touch is formed at a required position of each of said piezoelectric element segments.

6. A cell according to claim 1, wherein a finger touch detection sensor for detecting a finger touch is formed at a required position of said graphic tactile surface.

7. A cell according to claim 1, wherein an arithmetic drive unit for applying a voltage to said piezoelectric element segments is formed integrally with said unit base.

8. A cell according to claim 1, wherein an arithmetic drive unit for applying a voltage to said piezoelectric element segments is connected to said unit base by means of housing connection.

* * * * *

UNITED STATES PATENT AND TRADEMARK OFFICE
CERTIFICATE OF CORRECTION

Page 1 of 2

PATENT NO. : 5,842,867
DATED : December 1, 1998
INVENTOR(S) : R.S. Hong et al.

It is certified that error appears in the above-indentified patent and that said Letters Patent is hereby corrected as shown below:

| COLUMN | LINE | |
|---|---|---|
| [56] Pg. 1, col. 1 | Refs. Cited (Foreign Pats., item 3) | Before "3733612 A1" insert --DE-- |
| [56] Pg. 1, col. 1 | Refs. Cited (Foreign Pats., item 5) | Before "3811406 A1" insert --DE-- |
| [56] Pg. 1, col. 1 | Refs. Cited (Foreign Pats., item 6) | Before "3920386 A1" insert --DE-- |
| [56] Pg. 1, col. 1 | Refs. Cited (Foreign Pats., item 7) | Before "3923967 A1" insert --DE-- |

UNITED STATES PATENT AND TRADEMARK OFFICE
CERTIFICATE OF CORRECTION

PATENT NO. : 5,842,867            Page 2 of 2
DATED : December 1, 1998
INVENTOR(S) : R.S. Hong et al.

It is certified that error appears in the above-indentified patent and that said Letters Patent is hereby corrected as shown below:

| COLUMN | LINE | |
|---|---|---|
| [56] Pg. 1, col. 2 | Refs. Cited (Foreign Pats., item 8) | Before "4241937A1" insert --DE-- |

Signed and Sealed this

Fifteenth Day of June, 1999

Attest:

Q. TODD DICKINSON

*Attesting Officer*      *Acting Commissioner of Patents and Trademarks*

UNITED STATES PATENT AND TRADEMARK OFFICE
CERTIFICATE OF CORRECTION

PATENT NO. : 5,842,867
DATED : December 1, 1998
INVENTOR(S) : R.S. Hong, et. al.

It is certified that error appears in the above-identified patent and that said Letters Patent is hereby corrected as shown below:

Title page, item [30], under Foreign Application Priority Data, insert --
October 16, 1996 [JP] Japan..... 8-273509--.

Signed and Sealed this

Twenty-fourth Day of August, 1999

Attest:

Q. TODD DICKINSON

*Attesting Officer*  *Acting Commissioner of Patents and Trademarks*